United States Patent Office
3,056,764
Patented Oct. 2, 1962

3,056,764
MANUFACTURE OF POLYMERS FROM POLYMERS OF UNSATURATED ACIDS
Neil Bonnette Graham and Gordon Hart Segall, St. Hilaire, Quebec, Canada, assignors to Canadian Industries Limited, Montreal, Quebec, Canada, a corporation of Canada
No Drawing. Filed Apr. 11, 1960, Ser. No. 21,119
Claims priority, application Canada May 15, 1959
2 Claims. (Cl. 260—78.4)

This invention relates to the manufacture of polymeric materials, and more particularly to improvements in the manufacture of polymers containing free β-hydroxyalkyl ester groups.

It is known to prepare polymers containing free β-hydroxyalkyl ester groups by the reaction of cyclic ethers with polymers, including copolymers, containing free carboxyl groups. For example, a copolymer of styrene and acrylic acid may be prepared which contains free carboxyl groups and this copolymer may be reacted in toluene solution with butylene oxide at an elevated temperature in the presence of a basic catalyst. The reaction appears to be the addition of butylene oxide molecules to many of the free carboxyl groups in the polymer to give β-hydroxybutyl ester groups. The attached groups in the polymer may alternatively be described as hydroxyl groups in the form of half-esters of a substituted glycol.

It is also known to carry out a similar reaction in aqueous alkaline solution. Such a process, however, suffers from certain disadvantages, notably in that it is wasteful of alkylene oxide because considerable amounts of by-product glycols are formed by the interaction of the oxide with water. Furthermore, polymerization of the oxide occurs when the low molecular weight oxides are used, giving for example polyethenoxy groups instead of β-hydroxyalkyl ester groups.

A further disadvantage of the process carried out in aqueous solution is that it is limited to the use of polymeric carboxylic acids which are soluble in aqueous alkaline solutions. Thus polymers containing less than about 10% of carboxylic acid groups cannot be used. These disadvantages are overcome by conducting the reaction under anhydrous conditions.

However, although the anhydrous reaction is advantageous, it has hitherto been found that the reaction with cyclic ethers of lower molecular weight, such as ethylene and propylene oxides, must be conducted in pressure equipment since these ethers are low boiling materials and at the minimum temperature hitherto proposed for the reaction, i.e., 80° C., their vapour pressure is considerable. It has hitherto been deemed essential that the cyclic ethers be in the liquid phase, and thus the reaction has not enjoyed success as a means of manufacturing polymeric resins for paint production inasmuch as the majority of paint manufacturers do not have pressure equipment available for this purpose. Furthermore, the commercially available alkylene oxides of attractive price are the low boiling ones. It has not, as far as is known, been hitherto suggested that ethylene and propylene oxides be reacted with carboxyl-containing polymers under anhydrous conditions without the use of pressure equipment.

It has now been discovered that gaseous ethylene and propylene oxides can be dissolved in anhydrous solutions of polymers containing free carboxyl groups and that the reaction proceeds at an appreciable speed at temperatures well below 80° C. to give polymers containing free β-hydroxyalkyl ester groups.

Thus it is an object of this invention to provide an improved process for the manufacture of polymers containing free β-hydroxyalkyl ester groups. A further object is to provide a process whereby a judicious and hitherto frowned upon choice of conditions allows ethylene and propylene oxides to be efficiently reacted with carboxyl-containing polymers without the use of pressure equipment. Other objects will appear hereinafter.

The improved process of this invention consists essentially of finely dispersing at least one gaseous alkylene oxide, at substantially atmospheric pressure and in the presence of a basic catalyst, into solution in an anhydrous inert solvent of a homopolymer or copolymer containing free carboxylic acid groups at a temperature not exceeding about 95° C.

The carboxyl-containing homopolymer or copolymer used in the process of this invention may be prepared by addition polymerization of many known monomers, suitably ethylenically unsaturated monomers. It is only necessary that the polymeric material contain free carboxyl groups, either attached to the main polymer chain or to side-chains, and be at least partially soluble in a suitable inert solvent such as xylene, butanol, toluene or absolute alcohol. The suitability of the solvent is determined not only by its ability to dissolve at least partially the carboxyl-containing polymer, but more particularly by its inertness to ethylene and propylene oxides. Thus, as shown hereinbefore, aqueous solvents are unsuitable since the oxide itself will readily react in the presence of water to form glycols and other undesirable products.

Typical polymeric materials include those obtained by the polymerization of polymerizable α,β-unsaturated carboxylic acids such as acrylic and methacrylic acids or their homologues or substituted derivatives such as crotonic acid or α-chloroacrylic acid, and also dibasic acids such as maleic and fumaric acids. Such acids may also be copolymerized with other suitable monomers, viz. ethylenically unsaturated compounds such as butadiene, styrene, vinyl toluene, methacrylates and acrylates. It must again be emphasized that the improved process of the present invention requires only that the polymeric material contain carboxylic acid groups and be at least partially soluble in a suitable inert solvent.

Many basic catalysts are suitable for the improved process of this invention. Amongst the inorganic bases, ammonia is particularly preferred since metallic bases such as caustic soda, while catalysing the reaction, are more difficult to remove from the produced polymer and also tend to cause the formation of polyethenoxy groups. Also particularly suitable are organic bases soluble in the reaction solvent, although insoluble bases may be used if amply dispersed. Preferred examples are tertiary amines derived from naturally produced long-chain fatty acids such as that which may be produced, for example, by reduction and dimethylation of the amides from hydrolysed cocoanut oil. The amount of catalyst required varies from polymer to polymer, but in general will lie between one- and four-thirtieths of an equivalent of the total acid present in the polymer. Greater quantities of catalyst may be used, but will often give a slightly coloured product. This is acceptable for certain applications.

There is a wide range of temperatures at which the improved process of this invention may be operated. The reaction proceeds with appreciable speed even at room temperature, and contrary to disclosures of prior pressurized processes, should not be conducted at temperatures greatly in excess of 80° C., or at the most 95° C. Any known method may be used for finely dispersing the gaseous alkalene oxide in the copolymer solution; particularly suitable are sintered glass dispersion plates and tubes or powerful agitation.

The polymers made by the process of this invention are particularly suitable for use in paint manufacture. They may be readily cross-linked by agents such as diisocyanates or maleic anhydride copolymers to yield tough, hard, protective films.

The improved process of this invention is further illustrated, but is in no manner limited, by the following examples in which the parts given are by weight unless otherwise specified.

EXAMPLE 1

Three carboxyl-containing copolymers were prepared by a standard addition polymerization method using a xylene-butanol mixture as solvent and a mixed peroxide initiator. Copolymer A was prepared from 80 parts of styrene and 20 parts of acrylic acid; copolymer B from 98 parts of methyl methacrylate and 2 parts of acrylic acid; and copolymer C from 10 parts of methyl methacrylate, 20 parts of styrene, 50 parts of ethyl acrylate and 20 parts of methacrylic acid. Each copolymer solution contained approximately 38% solids and, after the addition of a basic catalyst, a gaseous stream of ethylene oxide was finely dispersed into a sample of each solution for a period of four hours while the solution was held at 60–80° C. The gas was passed into the solution at such a rate that substantially no off-gas was observed. The basic catalysts were respectively: catalyst 1, trimethyl, n-octadecylammonium hydroxide; catalyst 2, a mixture of primary amines derived from soya acids; and catalyst 3, a mixture of tertiary amines made by reduction and dimethylation of the amides of cocoanut acids. The results are given in Table I.

*Table I*

|  | Copolymer A | Copolymer B | Copolymer C |
|---|---|---|---|
| Approx. equivalents of ethylene oxide absorbed per equivalent of acid | 1 | 10 | 1.3 |
| Percent acid in polymer by titration: | | | |
| before reaction | 20.0 | 2.14 | 19.1 |
| after reaction | 2.8 | 1.2 | 0.78 |
| Catalyst, 4/30 equivalent | catalyst 1 | catalyst 2 | catalyst 3 |

In addition it was observed that in the case of copolymer C and catalyst 3 the absorption slowed down sharply when about one equivalent of ethylene oxide had been absorbed. Further experiments showed that very rapid absorption can be obtained for both ethylene and propylene oxides into polymers containing up to 100% of the carboxylic acid-containing monomers.

EXAMPLE 2

A further copolymer was prepared, by the method described in Example 1, from 50 parts of styrene, 40 parts of ethyl acrylate and 10 parts of acrylic acid. The solvent was xylene, and the resulting copolymer solution contained about 48% total solids. Gaseous propylene oxide was dispersed into 60 g. of this solution through a sintered glass tube, while the solution was held at 90° C. Approximately $\frac{1}{15}$ of an equivalent of catalyst 3 of Example 1 was used, and in 2 hours 3.3 g. of propylene oxide was absorbed. The percentage of acid in the polymer was measured by titration both before and after reaction, and the percentages were respectively 9.8% and 0.0% of acid, thus indicating that substantially all the free carboxylic acid groups had reacted to give their β-hydroxypropyl esters.

What we claim is:
1. A process which comprises reacting together, at a temperature between 20° C. and 95° C. and at substantially atmospheric pressure,
   (1) a polymer selected from the group consisting of homopolymers of α,β-ethylenically unsaturated carboxylic acids and copolymers of said acids with at least one other ethylenically unsaturated monomer copolymerizable therewith, said polymer being in solution in an anhydrous inert solvent, and
   (2) about one equivalent, based on the acid groups in said polymer, of at least one finely dispersed gaseous alkylene oxide selected from the group consisting of ethylene oxide and propylene oxide, in the presence of
   (3) between $\frac{1}{30}$ and $\frac{4}{30}$ of an equivalent, based on the acid groups in said polymer, of a catalyst selected from the group consisting of ammonia, caustic soda and organic amines soluble in said solvent.
2. A process as claimed in claim 1 wherein the catalyst is the mixture of tertiary amines from the reduction and dimethylation of the amides of naturally produced long chain fatty acids.

References Cited in the file of this patent

UNITED STATES PATENTS

| 2,607,761 | Seymour | Aug. 19, 1952 |
| 2,742,494 | Mraz | Apr. 17, 1956 |
| 2,779,783 | Hayes | Jan. 29, 1957 |
| 2,842,519 | Ripley-Duggan | July 8, 1958 |

FOREIGN PATENTS

| 1,034,854 | Germany | July 24, 1958 |